March 27, 1934.   A. J. HALTRICH ET AL   1,952,858
SIGNALING DEVICE
Filed April 4, 1930

Inventors
William Haltrich
and
Adolf J. Haltrich
By Harvey R. Hawgood
Attorney

Patented Mar. 27, 1934

1,952,858

UNITED STATES PATENT OFFICE 1,952,858

SIGNALING DEVICE

Adolf J. Haltrich and William Haltrich, Cleveland, Ohio

Application April 4, 1930, Serial No. 441,656

6 Claims. (Cl. 200—34)

This invention relates to a signaling device, and more particularly to a device of the character by which the driver of a vehicle can signal his intention of making a turn, to the traffic behind him.

An object of the invention is to provide an improved signal which may be manually actuated by the driver, and which will be automatically discontinued after a predetermined period of time. Another object is to provide an improved signaling device which will be simple in construction and operation.

Other objects will hereinafter appear.

The invention will be better understood from the description of one practical embodiment thereof illustrated in the accompanying drawing, in which.

It has heretofore been proposed to provide the rear of an automobile or like vehicle with lights for indicating that the driver is about to make either a right or left turn.

These signals have in general been manually actuated, being turned on by the driver before making the turn, and turned off thereafter. Due to the distractions of modern traffic, the driver is inclined to forget to turn off these lights after having made a turn, and the drivers following him are thereby confused and the signal fails to accomplish its purpose.

By the applicants' invention, the driver may turn on the signal lights, which will remain on for a sufficient period of time to permit him to make the contemplated turn, and will then be automatically turned off.

Figure 1:
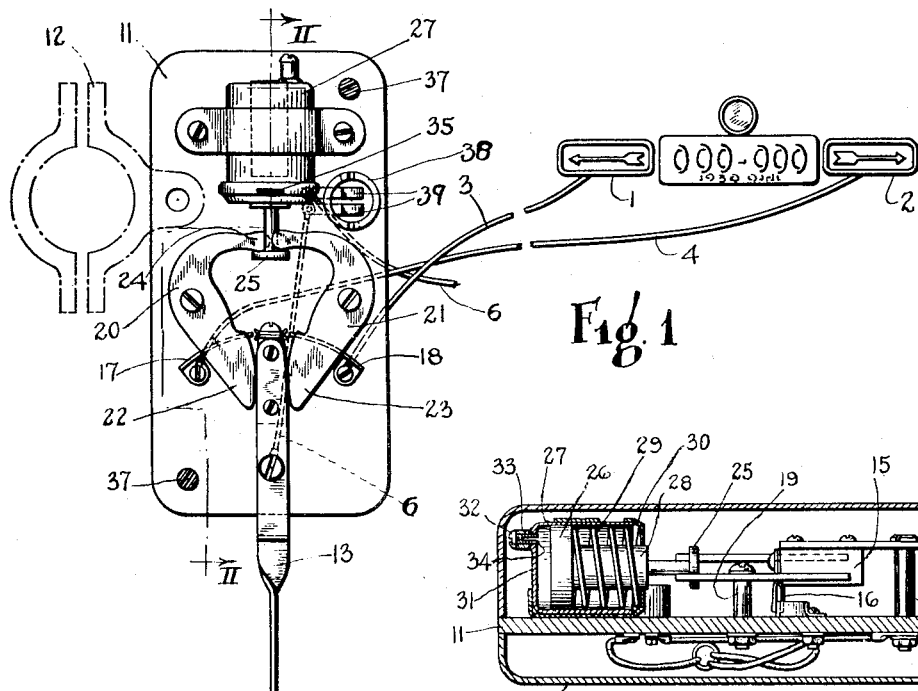
Figure 1 is a plan view of the switch mechanism used for operating the signal lights, the covering therefor being removed.
Figure 5:
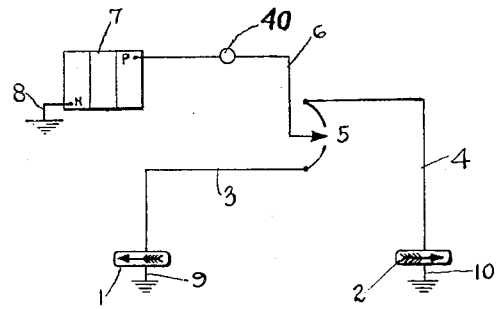
Figure 5 is a wiring diagram.
Figure 4:
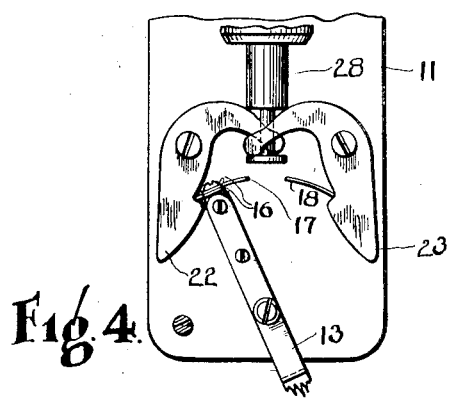

In Figures 1 and 5, two signal lights 1 and 2 are shown for indicating, respectively, left and right turns, these each consisting of an electric bulb in a reflecting casing covered by an appropriate lens which may bear any desired indicia, shown as arrows in the drawing, the lights most conveniently being positioned adjacent the usual tail light or rear license number of the vehicle on suitable supports (not shown).

The lights are connected by conductors 3 and 4 with the switching mechanism 5 which in turn is connected by a conductor 6 to the battery 7 of the vehicle, and the other terminal battery is grounded as at 8, the lights themselves being grounded at 9 and 10 as shown in Figure 5. It will be apparent that when the circuit through conductor 3 is closed, light 1 is illuminated, and when the circuit through conductor 4 is closed, light 2 is illuminated.

The switching mechanism consists of an insulated base 11 attached by a clamp 12 to the steering column of the vehicle immediately below the steering wheel. Upon this base is pivoted a hand operating lever 13 carried by a post 14 and having on its inner end a block which is shown as of insulating material 15 which carries electrical contact fingers 16. These fingers are arranged to be brought into contact with two arcuate stationary contacts 17 and 18 carried by the base 11, by the swinging of the lever 13. The contact 17 is connected to conductor 4 and contact 18 is connected to conductor 3.

It will, therefore, be seen that when the end of the lever 13 is moved to the right, the signal 2 indicating a right turn is illuminated, and when the lever is moved to the left, signal 1 indicating a left turn is illuminated. Pivoted upon posts 19 carried by base 11 are two oppositely disposed bell-crank-like levers 20 and 21 having curved ends 22 and 23 which bear upon the sides of insulating block 15. The opposite ends of these levers 24 are arranged to engage a head 25 of a piston 26 which reciprocates in cylinder 27 carried by base 11.

Within the cylinder and surrounding the stem 28 of the piston is a compression spring 29 which bears at its inner end upon the piston head and at its outer end upon a cap 30 secured to the cylinder. This spring is arranged to return the arm 13 to a central position in which fingers 16 are out of contact with either of the segmental contacts 17 and 18.

The closed end 31 of cylinder 27 is provided with a threaded aperture in which is inserted a slotted screw 32, a piece of rubber tubing or the like 33 being used to surround the screw to prevent the same from becoming loose and to restrict the escape of air from cylinder 27. The size of the discharge opening may be regulated by adjusting the screw to vary the area of the slot 34 which extends beyond the end 31 of the cylinder. A vent 35 is provided through cap 30, so that when the piston shank is drawn out by either of the levers 20 or 21, no compression of air between the piston and cap will be caused. The cylinder is provided with a vent about mid-way its length which will be uncovered by the piston when drawn outwardly to allow air to enter the closed end of the cylinder and relieve the vacuum caused therein.

Obviously when the lever 13 is rotated to actuate one of the lights, the spring will tend to restore the parts to their normal positions, but this restoration will be delayed by the piston 26 expelling the air from cylinder 27 and the time taken to expel this air will be proportionate to the area of the vent provided by screw 32.

Figure 2:
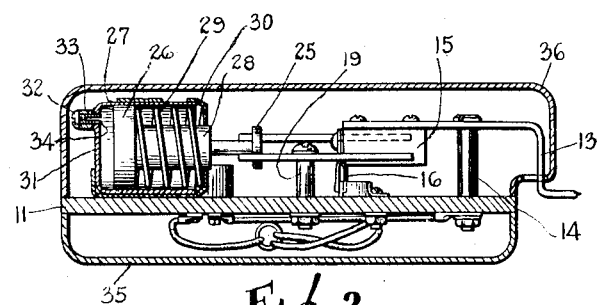
Figure 2 is a longitudinal section taken on the line II—II of Figure 1.
Figure 3:
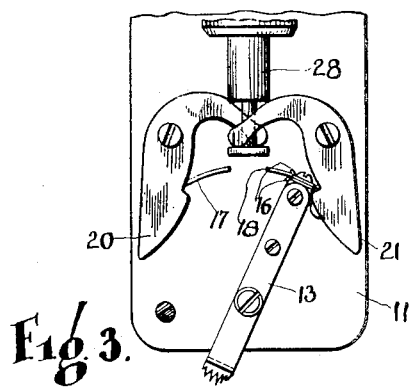
Figures 3 and 4 are fragmentary views similar to Figure 1, but showing positions of the parts in operation.

Top and bottom covers 35 and 36 are provided to inclose the switch parts and are retained together by screws 37 passing through the insulating base 11. Lever 13 is downwardly offset within the casing, so that the opening from which it passes may be downwardly directed to prevent entrance of rain or the like to the interior of the casing, as illustrated in Figure 2.

In Figure 1 is shown a bulb socket 38 provided in the insulating base 11 and beneath this are contact springs 39 which are connected into the circuit of conductor 6, so that a lamp 40, inserted in the socket, will be illuminated whenever either of the signal lights are illuminated, enabling the driver to tell from his seat whether the signals are operating, as the lamp 40 will remain dark if either of the signal bulbs or the bulb 40 itself are burned out.

While we have described the illustrated embodiment of our invention in some particularity, obviously many others will readily occur to those skilled in the art to which this appertains and we, therefore, do not limit ourselves to the precise details shown and described herein, but claim as our invention all embodiments, variations and modifications coming within the scope of the subjoined claims.

We claim:

1. A switch comprising an insulating base, a support therefor, a pivot fixed upon said base, an actuator mounted on said pivot, a movable contact carried thereby, two stationary contacts carried by said base, pivoted levers arranged to be selectively moved by the movement of the actuator, a cylinder carried by the base, a piston in the cylinder and arranged to be moved in one direction by either of said levers, a spring connected to said piston to be placed under tension when the piston is moved by either lever, and a vent through said cylinder.

2. A switch comprising an insulating base, a support therefor, a pivot fixed upon said base, an actuator mounted on said pivot, a movable contact carried thereby, two stationary contacts carried by said base, pivoted levers arranged to be selectively moved by the movement of the actuator, a cylinder fixed upon the base, a piston in the cylinder and arranged to be moved in one direction by either of said levers, a spring connected to said piston to be placed under tension when the piston is moved by either lever, a vent in said cylinder, and an adjustable valve mechanism controlling said vent.

3. A switch comprising a base, three pivots carried thereby, an actuator upon one of said pivots, a bell crank lever pivoted upon each of the other pivots, the levers being arranged to be moved by movement of the actuator, a plunger reciprocable by either of said bell crank levers, a spring urging the plunger in one direction, fluid resistance means controlling the movement of said plunger in said direction, a movable contact operated by said actuator, and two stationary contacts arranged to be selectively engaged by said contact.

4. A switch comprising a pivoted actuator, a contact carried thereby, two stationary contacts, one positioned on each side of the central position of the first mentioned contact, two levers adjacent said actuator so that one is oscillated by the movement of the actuator in either direction, a piston movable in one direction by said levers and returned in the opposite direction by a spring, a cylinder surrounding said piston and having a vent open to the atmosphere.

5. A switch comprising a pivoted handle, a contact carried thereby, two stationary contacts, one positioned on each side of the central position of the handle, two levers adjacent said handle so that one is oscillated on the movement of the handle in either direction, a piston operated in one direction by said levers and returned in the opposite direction by a spring, a cylinder surrounding said piston, and an adjustable vent in said cylinder.

6. A switch for vehicle signals comprising a base, a handle pivoted thereon, two bell crank levers pivoted on said base each having an end in position to be moved by the handle, a plunger reciprocable by either of said bell cranks, a spring urging the plunger in one direction, and fluid resistance means controlling the motion of said plunger in said direction.

ADOLF J. HALTRICH.
WILLIAM HALTRICH.